Nov. 6, 1934.  C. H. KENNEWEG  1,979,746
INTERNAL COMBUSTION ENGINE
Filed Dec. 27, 1929
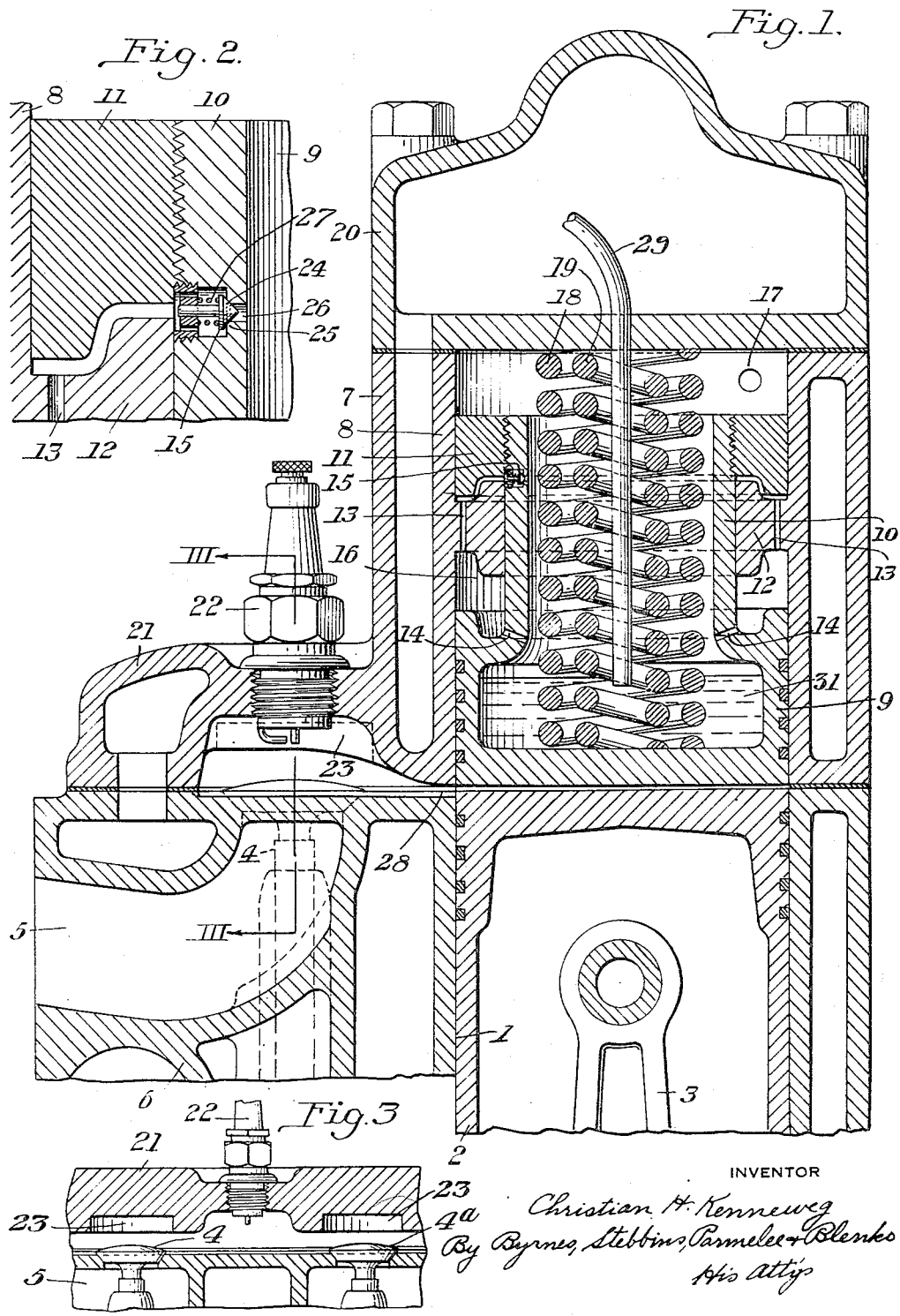

Patented Nov. 6, 1934

1,979,746

UNITED STATES PATENT OFFICE 1,979,746

INTERNAL COMBUSTION ENGINE

Christian H. Kenneweg, Millvale, Pittsburgh, Pa.

Application December 27, 1929, Serial No. 416,797

2 Claims. (Cl. 123—78)

My invention relates to internal combustion engines and more particularly to the Otto cycle type.

In accordance with my invention, I provide a variable-clearance, internal-combustion engine having the constant compression and high thermal efficiency characteristic of engines operating on the Diesel principle, as well as the mechanical features and operating characteristics of engines operating on the Otto principle. It is an object of the invention to provide an engine having a performance, flexibility, and useful life comparable to that of engines of the Otto type, together with means for controlling detonation and avoiding its undesirable results. This control of detonation is accomplished by absorbing and storing the maximum explosion pressure for delivery to the piston after the initial explosion.

It is known that engines operating on the Otto cycle continue to function satisfactorily even after the wear on the moving parts has reached a point that leakage of the charge occurs on maximum compression before combustion. The engine of my invention also possesses this desirable characteristic, as well as the simple fuel vaporizing and distributing system of the Otto cycle engine.

In contradistinction to the above, in relatively high speed, small-bore, multiple cylinder Diesel type engines, either two or four cycle, air, or straight fuel injection, hot bulb or otherwise, the following general conditions exist.

In the first place, in Diesel type engines, the fuel must be metered or measured and injected under sufficiently high pressures to assure proper atomization or pulverization of the liquid fuel in order to take care of rapid combustion. In this connection, the amount or quantity of fuel per power impulse under light-load operating conditions in small multiple cylinder engines suitable for automotive power plants is so small, i. e., a small fraction of a cubic millimeter per power impulse, that mechanical limitations substantially preclude the possibility of ever providing a suitable metering device that will remain in adjustment for periods of sufficient duration to assure the practicability of the apparatus or of the engine itself.

The abnormal pressures required for thorough and complete pulverization and injection into the compressed air charge necessary for high-speed combustion being from several thousand to over ten thousand pounds per square inch indicates the seriousness of the problem and shows conclusively that the reduction in engine cylinder capacity is strictly limited and that the lower limit is substantially higher than that desirable for average automobile engines. That is to say, Diesel engines are not practical for modern automobiles.

Diesel engines, furthermore, because of the extremely high initial compression required for igniting the fuel when starting a cold engine, must have almost perfect mechanical correlation of all moving parts to prevent leakage through valves and past piston rings. It is generally recognized that the wear resulting from normal use of a Diesel engine soon permits such leakage that the necessary pressures cannot be maintained. It is also known that an engine operating on the Otto cycle will continue to maintain its operating efficiency even after considerable wear of the moving parts such as to permit a substantial leakage of compressed fuel vapor before combustion.

Other things being equal, the Otto cycle engine is as efficient thermally and volumetrically or more so than the Diesel engine. In this connection, the only limiting factor is the detonation or uncontrolled combustion of the more volatile fuels commonly used in the Otto cycle engine. The increased efficiency of the Otto cycle engine over the Diesel engine is due to the degree of increased homogenizing of the fuel and air charge, which, by reason of the increased time element and the increased mixing action obtained by the carburetion and fuel intake systems of the Otto cycle engine, are much more thorough and complete in the Otto cycle engine than can be obtained by direct injection as in the Diesel engine.

The herein described engine includes an auxiliary piston and cylinder therefor having means associated therewith for accumulating a portion of the maximum pressure developed in the main engine cylinder when the explosion occurs and means for limiting the travel of the auxiliary piston, said pressure storing means and piston travel limiting means coacting with each other to control the maximum explosion pressure in the main engine cylinder.

These and other useful and desirable provisions of my invention are to be found in the following description, having reference to the accompanying drawing, in which Figure 1 is a partial transverse sectional view through a cylinder of the engine of my invention;

Figure 2 is an enlarged sectional view of a detail shown in Figure 1, and

Figure 3 is a view in section of a portion of the engine taken on the line III—III of Figure 1.

Referring to the drawing, there is shown a block 6 having a cylinder 1 provided with a reciprocating piston 2 therein for moving connecting rod 3 in the usual manner. Reciprocating valves 4, 4a are provided for operating in the usual manner in automotive practice to admit fuel on the intake stroke of the piston 2 and to discharge the exhaust gases from the cylinder. On the intake stroke of the piston 2, the left-hand valve 4 is opened and fuel is drawn into the cylinder from the opening 5. The valve 4 is subsequently closed during the compression and explosion periods of the piston 2 in the usual manner and the right-hand valve 4a is then opened to discharge the exhaust gases from the chamber.

The engine block 6 and its accompanying apparatus so far described is similar to any modern automotive vehicle engine of the Otto cycle type.

I provide a cylinder head 7 that is adapted to be mounted directly on and secured to the cylinder block 6. The head 7 is provided with a cylinder 8 corresponding and registering with the main cylinder 1. Within the auxiliary cylinder 8 is an auxiliary piston 9 having an upper annular wall 10 of reduced diameter onto which is secured in any suitable manner a ring 11 of substantially the same diameter as the cylinder.

The central portion of the cylinder 8 is provided with a projecting ring 12 that co-acts with the reduced-diameter wall 10 of the piston 9. Oil drain openings 13 and 14 are provided extending respectively through the ring-like projection 12 and the wall 10 of reduced diameter of the piston 9. These openings serve to drain oil from the pneumatic chambers.

The oil which leaks from the pneumatic chamber collects by the action of gravity on the bottom of the chamber 31 within the piston from whence it is forced into a vertical pipe 29 suspended from the jacket 20 within the cylinder 8. The pipe 29 preferably communicates in a similar manner with the other upper cylinders and finally discharges the oil into the crank case. An air or oil mist pump (not shown) communicating with an opening 17 may be used to raise the air pressure within the cylinder 8, to thereby force the oil through the pipe 29. In this manner the amount of oil within the piston 9 is never allowed to exceed a maximum predetermined quantity.

The piston 9 is of hollow construction for the accommodation of concentric coil-springs 18 and 19 positioned between the piston 9 and the lower surface of the engine head 20 that is mounted on and secured to the auxiliary head 7. The coil-springs 18 and 19 are adapted to force the auxiliary piston 9 toward its extreme downward position at which the lower surface of the ring 11 prevents further movement by its contact with the upper surface of the projection 12. The reverse upward travel of the piston 9 is limited by the co-action of the lower surface of the projection 12 with the upper surface of the shoulder of the piston 9.

As mentioned above, shocks between both the travel limits of the piston 9 are taken up by a pneumatic check provided by entrapped air within the surrounding spaces, the movement of which out of the spaces is limited only by a small leakage through the small openings 13 and 14 and the valve 15. A double annular pneumatic check is thereby provided for limiting the movement of the piston 9.

The pressure springs 18 and 19 permit the piston 9 to be moved upwardly when the fluid pressure between the main piston 2 and the auxiliary piston 9 is of a sufficient magnitude to over-balance the pressure of the springs. The springs co-act with the pressure of the entrapped air in the pneumatic check of the piston 9 to return energy to the main piston 1 on its downward stroke after an explosion has occurred.

The auxiliary head 7 is provided with an extension 21 for the accommodation of a spark plug 22 in the vicinity of the valve 4. The under surface of the extension 21 is provided with recesses 23 opposite the valves 4 for accommodating the latter in their extreme upward position. The exhaust valves are protected, when in the recesses 23, from the harmful action of the exhaust gases. The intake and exhaust valves are removed from the path of the incoming and outgoing gases respectively by being entirely enclosed, except at their bottom, within the recesses 23. The spark plug 22 operates in the usual manner to ignite the explosive charge when placed under compression by the piston 2 in the cylinder 1. The gas burns from the spark through the opening 28 and into the cylinder 1.

The vacuum release valve 15, as shown in Figure 2, preferably comprises a cone-shaped plunger 24 that is adapted to seat on a shoulder 25 in a portion of the periphery of an opening 26 in the wall 10 of the piston 9. A spring 27 is provided for keeping the valve closed except when a difference of pressure between the chambers 16 and 31 forces it open against the action of the spring. Upon the creation of a vacuum in the upper pneumatic chamber, the valve 15 opens and relieves it.

As set forth above, after the fuel has been drawn into the cylinder 1 and the piston 2 is on its compression stroke, the springs 18 and 19 permit the auxiliary piston 9 to move upwardly to maintain the pressure of the fluid in the cylinder 1 constant, and, after the fuel has been ignited by the spark plug 22 and the piston 2 is on its downward stroke, the springs 18 and 19 aided by the pressure of the compressed gases within the lower pneumatic check chamber, force the auxiliary piston 9 in a downward direction and return the energy stored in them back to the piston 2. This return of stored energy takes place when the crank angle has reached a highly favorable position, that is, 30° to 90° past its top dead center.

As is well known, the maximum explosive pressure usually occurs when the piston is at or near top dead center, that is, when the crank angle, the connecting rod and the piston are in a substantially straight line. In the herein described device, means are provided for storing up a portion of the maximum developed pressure during this time and for restoring the accumulated energy after the crank angle has reached a more favorable position of between 30° and 90° past its top dead center.

This provision reduces the stresses on the various engine parts, such as pistons, connecting rods, crank shaft bearings, etc., and thereby minimizes the danger of breakage of engine parts and reduces bearing stresses to a very large extent and provides a much smoother engine performance and power output.

The modulus of elasticity of the springs 18 and 19 is, preferably, such that at relatively slow speeds of the engine, the auxiliary piston 9 does not function at all, but remains substantially stationary, the engine operating in the conventional manner. At higher speeds, and consequently higher compression of the gases within the cylinder, the pressure of the springs 18 and 19 is overcome and the auxiliary piston begins to operate in the manner described.

Upon the occurrence of an explosion within the cylinder 1, the pistons 2 and 9 are forced apart. The piston 9 is moved against the pressure of the springs and the pressure created by the air entrapped within the lower pneumatic chamber. Any vacuum created in the upper chamber is quickly relieved by the valve 15, which opens against the force of the small spring 27.

As the pressure within the cylinder is absorbed by the piston 2, the pressure accumulated by springs and by the air entrapped in the lower pneumatic chamber forces the auxiliary piston downward, thereby returning the stored energy back to the piston 2, at an advantageous angular position of the crank supporting the piston 2.

The pneumatic chambers provide air cushions for preventing the contact and consequent rattling of the moving and stationary parts of the auxiliary piston and cylinder assembly, in addition to the energy storing and energy returning ability of the lower pneumatic chamber co-acting with the vacuum relieving valve 15 for the upper pneumatic chamber.

The small openings 13 and 14 are provided to drain from said pneumatic chambers any oil that might happen to seep thereinto.

While I have illustrated but a single cylinder, it will be clear that my device is applicable to, and is preferably to be used on, a four, six and eight cylinder engine of the conventional automotive vehicle type. For such engines, the auxiliary head 7 is provided with a corresponding number of cylinders for registration and co-action with the cylinders of the engine. The oil pipe 29 in such case would extend from the inside of one cylinder to the upper portion of the next so that air pressure applied to the opening 17 of the first cylinder would be transmitted from one cylinder to the other, thereby, preventing an accumulation of oil within the chamber 31 of the auxiliary pistons, above a predetermined amount. An oily mist or vapor is preferably maintained through this system for lubricating all wearing surfaces of the piston 9.

It is to be noted that desirable features of the herein described device reside in the maximum explosion pressure control provided by the pressure springs and in the double annular pneumatic checks that are provided to limit the travel of the auxiliary piston and to store up or accumulate a portion of the maximum pressure developed in the engine cylinder when the explosion occurs.

While I have shown two springs 18 and 19, it will, of course, be apparent to those skilled in the art that one or any other number of springs may be used for accomplishing the same purpose without departing from my invention.

While I have disclosed the auxiliary pistons as being restrained by springs, nevertheless it will be apparent to those skilled in the art that the auxiliary pistons may be restrained by means of any similar pressure-storing medium, such, for example, as a fluid disposed in the space between the auxiliary pistons and the inside of the auxiliary cylinders. In this case, the auxiliary pistons would be operated exclusively by pneumatic means both in the pressure-storing stroke and in the pressure-returning stroke, as well as in the limits of the pressure-returning stroke which is taken care of in the manner similar to that disclosed in connection with the spring-restrained auxiliary pistons.

It will also be apparent to those skilled in the art that a modern automobile engine of the conventional type is converted into a highly efficient engine by the application of an auxiliary cylinder and spring-restrained piston similar to that disclosed above.

While I have illustrated and described the preferred form of my invention, it will be understood that it is not thus limited, but may be otherwise embodied within the scope of the following claims.

I claim:

1. A head for the cylinder of an internal combustion engine comprising a chamber constituting an extension of said cylinder, an open ended piston in said chamber having an annular, peripheral recess, means for limiting the travel of said piston including a projection from the wall of the chamber coacting with the recess in said piston, providing a pneumatic check at the limits of movement of said piston, and a spring extending into the open end of said piston and engaging the end of the chamber for biasing the piston toward one of said limits of movement.

2. A head for the cylinder of an internal combustion engine comprising a chamber constituting an extension of said cylinder, an open ended piston in said chamber having an annular, peripheral recess, means for limiting the travel of said piston including a projection from the wall of the chamber coacting with the recess in said piston, providing a pneumatic check at the limits of movement of said piston, the projection and the piston having openings for draining fluid, and a spring extending into the open end of said piston and engaging the end of the chamber for biasing the piston toward one of said limits of movement.

CHRISTIAN H. KENNEWEG.